(12) United States Patent
Rom et al.

(10) Patent No.: US 10,360,542 B2
(45) Date of Patent: Jul. 23, 2019

(54) PAYMENT PLATFORM FOR ONLINE SERVICE PROVIDERS

(75) Inventors: Guy Rom, Sunnyvale, CA (US); George Lee, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 685 days.

(21) Appl. No.: 13/196,742

(22) Filed: Aug. 2, 2011

(65) Prior Publication Data
US 2013/0036046 A1 Feb. 7, 2013

(51) Int. Cl.
*G06Q 20/12* (2012.01)

(52) U.S. Cl.
CPC .................. *G06Q 20/12* (2013.01)

(58) Field of Classification Search
USPC ....................................... 705/1.1, 4
See application file for complete search history.

(56) References Cited

U.S. PATENT DOCUMENTS

| | | | | |
|---|---|---|---|---|
| 7,158,955 B2* | 1/2007 | Diveley | .................. | G06Q 20/02 235/375 |
| 2002/0007313 A1* | 1/2002 | Mai | ........................ | G06Q 30/02 705/14.13 |
| 2003/0105689 A1* | 6/2003 | Chandak et al. | ................ | 705/35 |
| 2008/0040129 A1* | 2/2008 | Cauwels et al. | .................. | 705/1 |
| 2010/0094698 A1* | 4/2010 | Cawley | .................. | G06Q 30/02 705/14.17 |

OTHER PUBLICATIONS

Points International Ltd. Reports 75% Annual Revenue Growth in the Second Quarter of 2007 Canada NewsWire [Ottawa] Aug. 15, 2007: 1.*
Folpe, Jane M. Fortune. Mar. 20, 2000, vol. 141 Issue 6, p. 28-28.*
New app: S&H green stamps go digital .(Brief Article)(Company Profile) Sarah Stambler's Marketing with Technology News , v 9 , n 7 , p. 2(3) Mar. , 2000.*
You Can't Lick 'Em Revived S&H Offers On-Line Greenpoints Satran, Dick. Philadelphia Daily News [Philadelphia, Pa] Oct. 21, 1999: 41.*

* cited by examiner

*Primary Examiner* — William E Rankins
(74) *Attorney, Agent, or Firm* — Fenwick & West LLP

(57) ABSTRACT

Payment providers interact with an online service provider using a standard interface provided by the online service provider for different payment providers. A payment provider can invoke the interface of the online service provider to add credits for a user of the online service provider. The online service provider allows users to make purchases using credits. The online service provider authorizes purchases made by the user based on credits available for the user or based on a history of payments from the user. The online service provider sends an invoice based on the purchases to the payment provider. The payment provider can be any system that can invoke the interface provided by the online service provider. For example, the payment provider can be a financial institution, another user, or a business that provides credits to the user for performing actions that benefit the business.

21 Claims, 5 Drawing Sheets

PAYMENT PLATFORM FOR ONLINE SERVICE PROVIDERS

BACKGROUND

This invention relates to payments for online transactions and in particular to interactions between payment platforms and online service providers.

Users purchase services or products from online service providers and need to make payments for their purchases. Payments for online services can be made in various ways, for example, by credit card, bank transfer, or check. Payment by check may require physical transfer of check and manual processing. Online service providers prefer payment mechanisms that can be processed electronically without requiring any manual processing, for example, credit card payments.

Users are often concerned about the safety of their credit card information when they provide the information to online service providers. The safety concerns may be about how the online service provider stores the information or how the information is transmitted during communications with the online service providers. As a result, various vendors provide payment services that users are more likely to be more comfortable with. For example, a payment provider may obtain the credit card information or bank account information from the user and the online service providers interact with the payment provider to complete the payment for a transaction. As a result, the user provides the credit card or bank account information to only a few payment providers rather than to each online service provider.

There can be multiple payment providers in the market. Examples of payment providers currently available include PAYPAL, BOKU, PLAYSPAN, and ZONG. Therefore, different users may use different payment providers. As a result, if an online service provider does not support a payment provider, a potential customer that relies on that online service provider may not be able to complete a transaction with the online service provider. An online service provider may lose a customer unless the online service provider can interact with the payment provider for the customer. Therefore, online service providers need to interface with as many payment providers as possible to facilitate payments for as many potential customers as possible. Since each payment provider may have a different interface for interacting with the payment provider, online service providers are faced with the task of developing and maintaining multiple interfaces for different payment providers. This may require the online service provider to utilize significant resources for development and maintenance of software that can be complex, error prone, and constantly changing.

SUMMARY

Embodiments of the invention allow payment providers to interact with an online service provider using an interface provided by the online service provider. The online service provider provides a standard interface for different payment providers. A payment provider can invoke the interface of the online service provider to add credits for a user of the online service provider. The online service provider allows the user to make purchases using the credits. The payment provider can be any system that can invoke the interface provided by the online service provider. For example, the payment provider can be a financial institution, another user, or a business that provides credits to the user for performing actions that benefit the business.

In an embodiment, the online service provider stores the number of credits assigned to each user. The online service provider receives a request from a payment provider to add credits for a user and increases the stored number of credits accordingly. If the online service provider receives requests to make purchases from the user, the online service provider authorizes the purchase based on the number of stored credits for the user. The online service provider sends an invoice based on the purchases to the payment provider. In some embodiments, the online service provider authorizes the purchase for the user based on past history of payments by the user. The payment provider is allowed to add credits for the user subsequent to the purchase.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Conventional online service providers initiate requests to the payment provider to complete the payment for a transaction. This requires conventional online service providers to support various interfaces provided by different payment providers. In contrast embodiments require the payment provider to send a request to the online service provider for making a payment on behalf of the user. As a result, instead of the online service provider invoking an interface provides by the payment provider, the payment provider invokes an interface provides by the online service provider. This allows the online service provider to maintain a standard interface that is used by different payment providers. Maintaining a standard interface invoked by different payment providers requires fewer development and maintenance resource compared to maintaining functionality that invokes interfaces provided by different payment providers. Furthermore, for purchases made by the user from the online service provider, the online service provider is not the merchant of record. Accordingly, the online service provider may not be held responsible to chargebacks related to purchases of the user since the user never directly pays to the online service provider for purchases.

Figure 1:
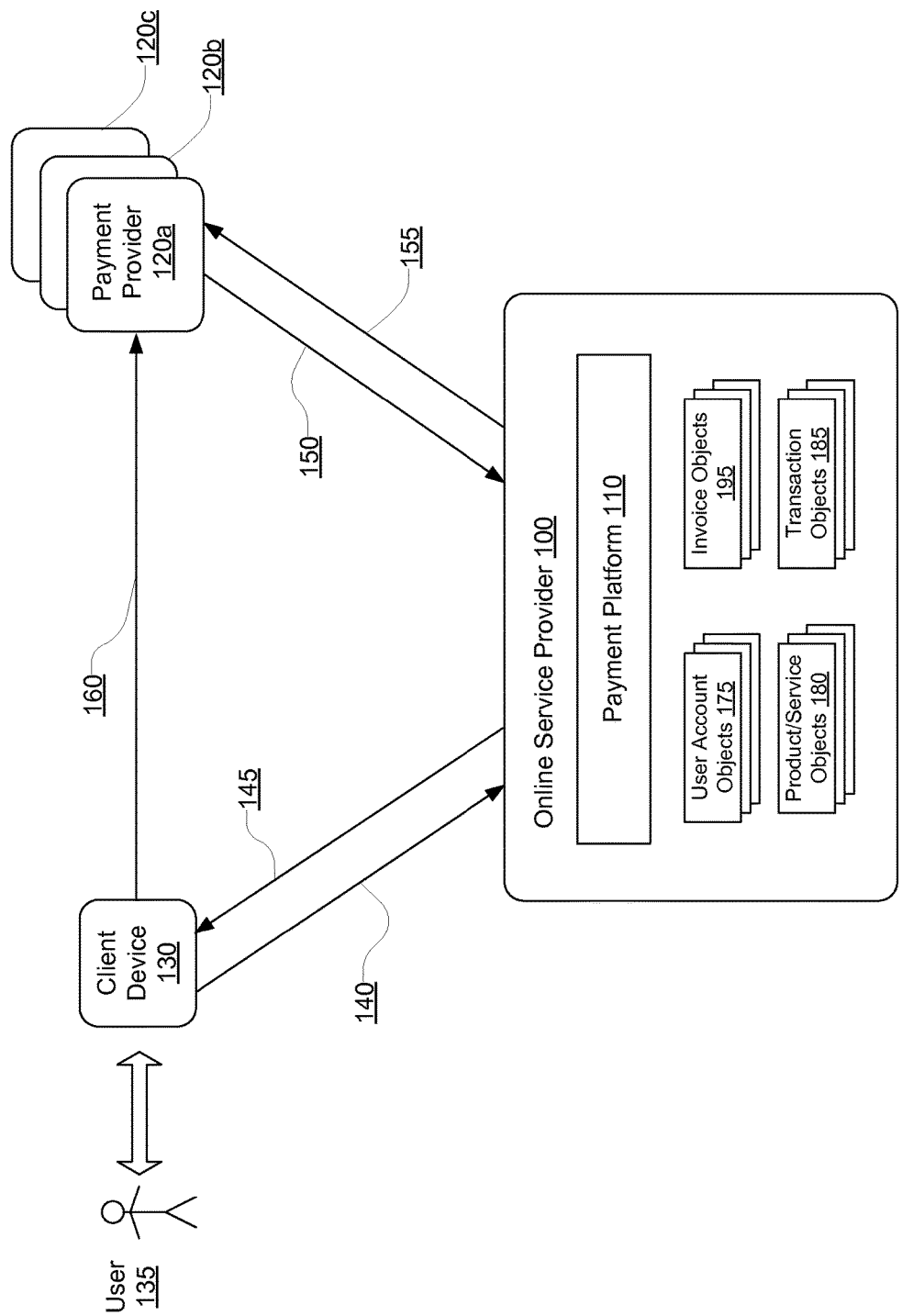
FIG. 1 is a diagram of a system environment illustrating payment providers interacting with an online service provider using a payment platform of the online service provider, in accordance with an embodiment of the invention.

FIG. 1 is a diagram of a system environment illustrating payment providers interacting with an online service provider using a payment platform of the online service provider, in accordance with an embodiment of the invention. An online service provider 100 may provide services and/or products to its customers. Examples of services and products provided by online service providers include music, videos, software, online games, information of different kinds as well as tangible goods, for example, books, equipment, or household items sold online. The term "service" refers to both services and products offered by the online service provider. The online service provider 100 offers services in return for payment by the user. Users utilize services of payment providers 120 to make payments to the online service provider 100. Users interact with the online service provider 100 and the payment provider 120 using a client device 130. The payment provider 120 interacts with the online service provider 100 to complete payments for purchases made by users of the online service provider 100.

FIG. 1 and the other figures use like reference numerals to identify like elements. A letter after a reference numeral, such as "120a," indicates that the text refers specifically to the element having that particular reference numeral. A reference numeral in the text without a following letter, such as "120," refers to any or all of the elements in the figures bearing that reference numeral (e.g. "120" in the text refers to reference numerals "120a" and/or "120b" in the figures).

As shown in FIG. 1, a user 135 sends a request 140 to an online service provider 100 using a client device 130 to purchase a service offered by the online service provider 100. The user does not interact directly with the online service provider 100 for making the payment. The user interacts 160 with a payment provider 120 and provides information useful for making payments, for example, credit card information or bank account information. The payment provider 120 sends a request 150 to the online service provider 100 to credit certain monetary amount to the user's account with the online service provider 100. The online service provider 100 provides 145 the requested service responsive to sufficient funds being available for the requesting user.

The online service provider 100 includes a payment platform module 110 that allows payment providers to interface with the online service provider 100. The online service provider 100 may comprise modules other than those shown in FIG. 1, for example, modules illustrated in FIG. 2 that are further described herein. The payment platform 110 provides an interface for the payment providers 120 to interact with the online service provider 100. In an embodiment, the payment platform 110 supports application programming interfaces (APIs), for example, APIs implemented as a web service. The online service provider 100 may publish the interface to the various payment providers 120.

If a new type of payment provider 120 is introduced in the market, the payment platform 110 does not have to be modified to support the new payment provider 120. On the other hand, if the new payment provider 120 needs to support customers of the online service provider 100, the new payment provider 120 must implement the functionality for interfacing with the payment platform 110. Since the online service provider 100 is not required to make changes each time a new type of payment provider 120 is introduced into the market, the maintenance of the payment platform 110 is much simpler.

The online service provider 100 maintains different types of objects representing entities, for example, user account objects 175, product/service objects 180, invoice objects 195, and transaction objects 185. An object may be stored for each instance of the associated entity. A user account object 175 stores information describing a user of the online service provider 100. The online service provider 100 may require its users to register in order to be able to interact with it, for example, to purchase a service or product. The user may be required to provide information including name, address, date of birth etc. The information provided by the user may be stored in the user account object 175.

The product/service objects 180 represent the products or services that are provided by the online service provider 100. The online service provider 100 may store in the product/service objects 180, information describing the corresponding products or services, for example, the name, description, categories describing the product or service, price associated with the product or service. In an embodiment, the online service provider 100 may store an instance of a product/service object 180 for each individual product/service from the inventory of the online service provider 100.

When a user initiates a transaction with the online service provider 100, for example, to make a purchase, the online service provider 100 creates a transaction object 185 for storing the information describing the transaction. The information stored in the transaction object 185 may comprise the product or service being purchased, the information describing the user that initiated the transaction, status of the transaction, and payment information describing whether payment has been made for completing the transaction. The status of the transaction may indicate whether the transaction has been completed or is in progress as well as the amount of progress made towards completion of the transaction.

The online service provider 100 also stores invoice objects 195 associated with one or more transactions. An invoice object 195 may be associated with a particular transaction or may be associated with a set of transactions completed during a time interval. For example, an invoice may be generated for all the transactions completed during a particular month or a billing cycle. In an embodiment, the online service provider 100 provides information stored in an invoice object 195 to a payment provider 120 upon request.

Online Service Provider System Architecture

Figure 2:
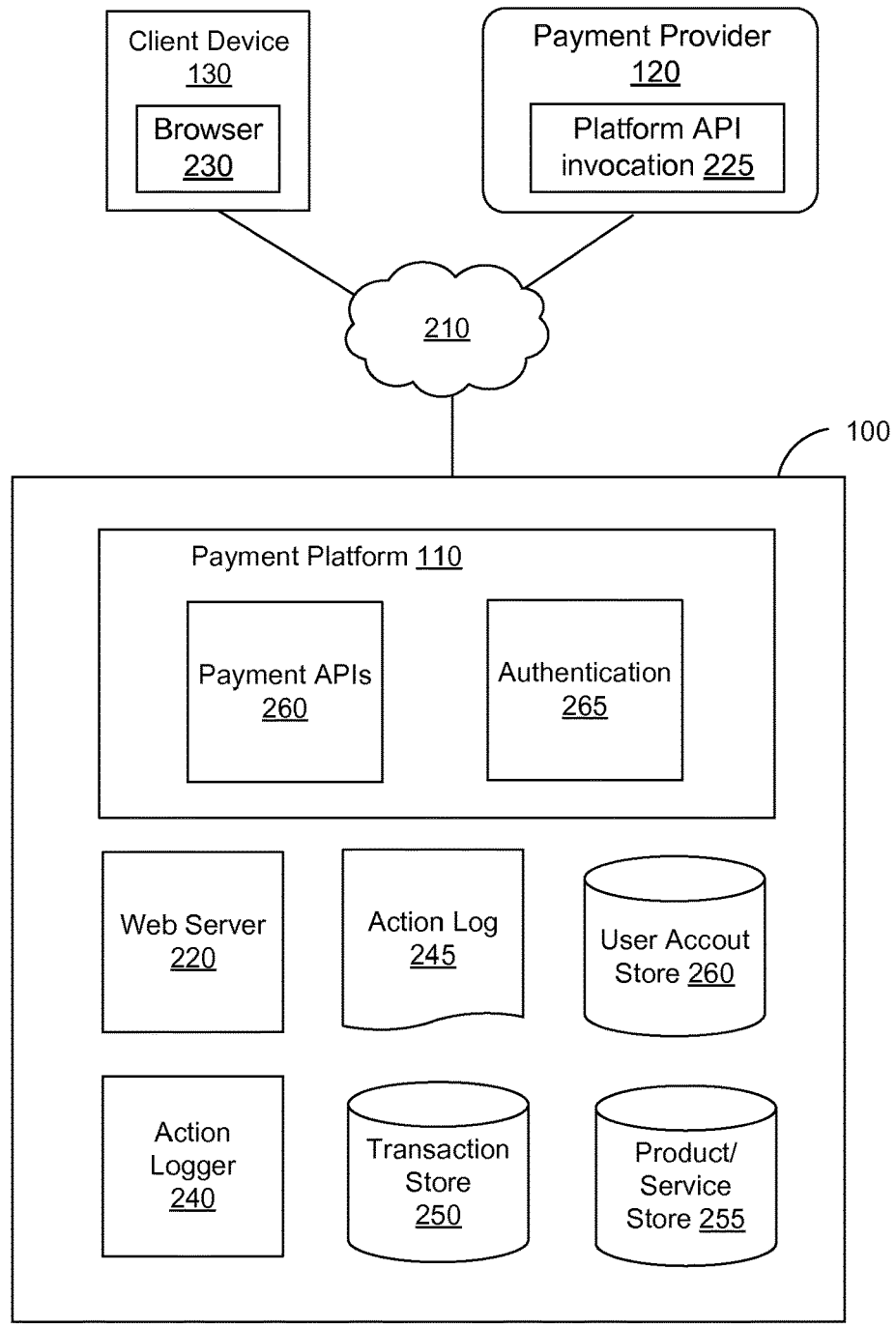
FIG. 2 is a diagram of the system architecture of an online service provider with a payment platform for allowing users to make payments using payment providers, in accordance with an embodiment of the invention.

FIG. 2 is a diagram of the system architecture of an online service provider 100 with a payment platform 110 for allowing users to make payments using payment providers, in accordance with an embodiment of the invention. The online service provider 100 includes a web server 220, a payment platform 110, an action logger 240, an action log 245, a user account store 260, a transaction store 250, and a product/service store 255. In other embodiments, the social networking system 100 may include additional, fewer, or different modules for various applications. Conventional components such as network interfaces, security mechanisms, load balancers, failover servers, management and network operations consoles, and the like are not shown so as to not obscure the details of the system. Certain modules shown as part of the online service provider 100 may run on a system different from the online service provider 100.

The web server 220 links the online service provider 100 via the network 210 to one or more client devices 130. The web server 220 serves web pages, as well as other web-related content, such as Flash, XML, and so forth. The web server 220 may provide the functionality of receiving and routing messages between the online service provider 100 and the client devices 130 as well as other external systems, for example, the payment provider 120. These messages can be instant messages, queued messages (e.g., email), text and SMS (short message service) messages, or any other suitable messaging technique.

The product/service store 255 stores information describing the products or services offered by the online service provider 100. The information stored for a product or service in the product/service store 255 may include the name and description of the product/service, quantities available for purchase by the users, an image or video describing the product/service, a purchase price for the product/service. A user can request the online service provider 100 to present information regarding one or more products/services offered by the online service provider 100. A user can also send a request to purchase one or more products/services offered by the online service provider 100. These requests can be sent using a user interface provided by the online service provider. The user interface provided by the online service provider 100 can be a web application presented to a user via the browser 230 on the client device 130.

When a user purchases a product/service offered by the online service providers 100, information describing the transaction is stored in the transaction store 250. The transaction store 250 stores information describing each transaction including the user that made the purchase, the product/service that was purchased, the number of each items purchased, and the total purchase price for the transaction. In an embodiment, the transaction store 250 also stores payment information for the transaction, for example, information indicating whether the payment for the transaction has been made or whether the payment is pending.

The user account store 260 stores information describing users that interact with the online service provider 100. The online service provider 100 may require a user to register with the online service provider 100 in order to make purchases. The user account store 260 stores information describing the user including name, address, and demographic information provided by the user, for example, age, gender, education, and interests. The user account store 260 stores an amount indicating the credits available to the user for making purchases. The credits for a user are indicative of the current purchase power of the user in the online service provider 100. The number of credits available to a user in the online service provider 100 can change, for example, when the user makes a purchase, the amount of credits for the user are reduced based on an amount of purchase. The online service provider may charge a transaction fee that may be further deducted from the credits of the user. Similarly, the credits for the user may be increased if a payment provider 120 transfers credits for the user to the online service provider 100.

The payment provider 120 provides credits responsive to the user making a payment to the payment provider 120, for example, by using a credit card, bank transfer, or by check. In an embodiment, if the user has established a good credit history with the payment provider 120, the payment provider 120 first transfers credits for the user to the online service provider 100 and then bills the user for the credits transferred requesting the user make payments. A user can make a request to the payment provider 120 to change the number of credits available to the user with an online service provider 100 by adding or removing credits.

The action logger 240 populates the action log 245 with information about user actions to track them. The action logger 240 is capable of receiving communications from the web server 220 about user actions performed using the online service provider 100. Any action that a particular user takes using the online service provider 100 is associated with the user's account 175, through information maintained in a database or other data repository. Such actions may include, for example, requesting a purchase of a service from the online service provider 100, requesting information describing products or services offered by the online service provider 100, or registering with the online service provider 100. Other actions that are not explicitly taken by the user but are performed by the online service provider 100 for executing tasks initiated by the user may be associated with the user's account. Examples of these actions include the online service provider 100 receiving credit for the user from a payment provider 120 or the online service provider 100 sending an invoice based on purchases made by the user to a payment provider 120.

In one embodiment, the client device 130 used by a user 135 for interacting with the social networking system 100 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 130 can be any device having computer functionality, such as a personal digital assistant (PDA), mobile telephone, smartphone, etc. The client device 130 may execute an application displaying a user interface, for example, an internet browser 230 for allowing the user of the client device 130 to interact with the online service provider 100 or with the payment provider 120.

The interactions between the client devices 130 and the online service provider 100 or the payment provider 120 as well as the interactions between the payment provider 120 and the online service provider 100 are typically performed via a network 210, for example, via the internet. The network 210 enables communications between the client device 220, the payment provider 120, and the online service provider 100. In one embodiment, the network 210 uses standard communications technologies and/or protocols. In another embodiment, the entities can use custom and/or dedicated data communications technologies instead of, or in addition to, the ones described above. Depending upon the embodiment, the network 210 can also include links to other networks such as the Internet.

The payment platform 110 provides an interface for payment providers 120 to interact with the online service provider 100. The payment platform 110 provides a standard interface that can be used by any system acting as a payment provider. A system can act as a payment provider, for example, if it invokes the payment APIs of an online service provider 100 to add credits and is responsible to making payments to the online service provider based on the credits added. The standard interface allows payment providers 120 to send requests to the online service provider 100 to perform certain actions or to request information. The online service provider 100 responds to the requests by providing the requested information. The online service provider 100 may determine if the payment provider 120 is authorized to obtain the requested information before sending the requested information. To this end, the payment platform comprises modules including a payment application programming interface (API) module 360 and an authentication module 265.

The payment APIs module 360 comprises a set of functions that can be invoked by the payment providers 120. Examples of functions provided by the payment APIs 260 include a function to transfer credits for a user, a function to request the balance available for a user, and a function to request an invoice for purchases made during a particular time interval. In an embodiment, the payment APIs are made available to the payment providers 120 as a web service.

The authentication module 265 verifies whether a sender of a request using the payment APIs 260 is authorized to obtain the requested information or to perform the requested action. In an embodiment, the online service provider 100 requires the payment providers to register with the payment platform 110. The online service provider 100 may perform background checks to ensure that the payment provider 120 is an authentic entity. The payment platform 110 may require the payment provider 120 to provide certain authentication information along with each request or to establish a session with the payment platform 110. Once a payment provider 120 establishes a session with the payment platform 110, the payment provider 120 may be allowed to send one or more requests using the session that are executed by the payment platform 110.

The payment provider 120 comprises a system that can add credits to a user's account in an online service provider 100. In an embodiment, the payment provider 120 can remove credits from the user's account in an online service provider 100. The payment provider 120 accepts payments from a user in return for adding credits for the user in an online service provider 100. In an embodiment, the payment provider presents a user interface for the user to interact with the payment provider 120, for example, to register with the payment provider 120 and to make payments. The user interface can be presented as a web application displayed using the browser 230 on a client device 130 of the user.

The payment provider 120 may accept payments using credit cards, bank transfers, checks or other means. The payment provider 120 comprises a payment API invocation module 225 that interfaces with the payment APIs 260 of an online service provider 100. Accordingly, in contrast with conventional online service providers that develop and maintain modules for sending payment requests to payment providers 120, embodiments require the payment provider 120 to maintain the payment API invocation module 225 module for interacting with the payment platform 110.

In an embodiment, the payment provider 120 can send a request to the payment platform 110 to determine the credits available for a user. If the number of credits available for purchase with an online service provider 100 exceed a threshold value, the payment provider 120 waits before transferring any credits for the user to the online service provider 100. If the number of credits available for the user in the online service provider are below a threshold value, the online service provider 100 transfers credits for the user to bring the purchase power of the user in the online service provider 100 above a threshold value.

A payment provider 120 can be a financial institution that processes payments made by users. From the perspective of the payment platform 110, the payment provider 120 can be any entity that can invoke the payment APIs 260. In an embodiment, a payment provider 120 can be a user if an application is available to the user that can invoke the payment APIs 260 for the user. For example, a parent or guardian for a user may transfer sufficient credits for the user to allow the user to make purchases for an agreed upon period, say a month. Periodically, the parent or guardian may replenish the credits for the user to allow the user to continue making purchases. If the user exceeds the amount credited for the user, the online service provider 100 denies the purchase requests from the user until the credits for the user are increased above a threshold amount.

Alternatively, a payment provider 120 can be a business that provides credits to the user for actions performed by the user that benefit the payment provider 120. A payment provider 120 can be another online service provider 100. A business may act as a payment provider and provide credits to a user for various actions including, liking a page of the business, sharing information posted by the business, recommending a product/service of the business, writing a review for the business, viewing an advertisement of the business and the like. Similarly, a business that offers a point based loyalty programs may add credits to the user for points previously earned by the user, for example, credits corresponding to airline mileage earned by the user, membership rewards, or points offered for using credit cards or making purchases with other online service providers 100. An online service provider 100 may allow a user to redeem credits for a discount code of a coupon code. In one embodiment, a user of the online service provider 100 may invoke the payment APIs 260 to transfer credit from the user's account to another user's account. In an embodiment, a service provider that provides games for users to play and awards game credits can invoke the payment APIs 260 to transfer game credits to another online service provider 100.

Payment Process Based on Payment Platform

Figure 3:
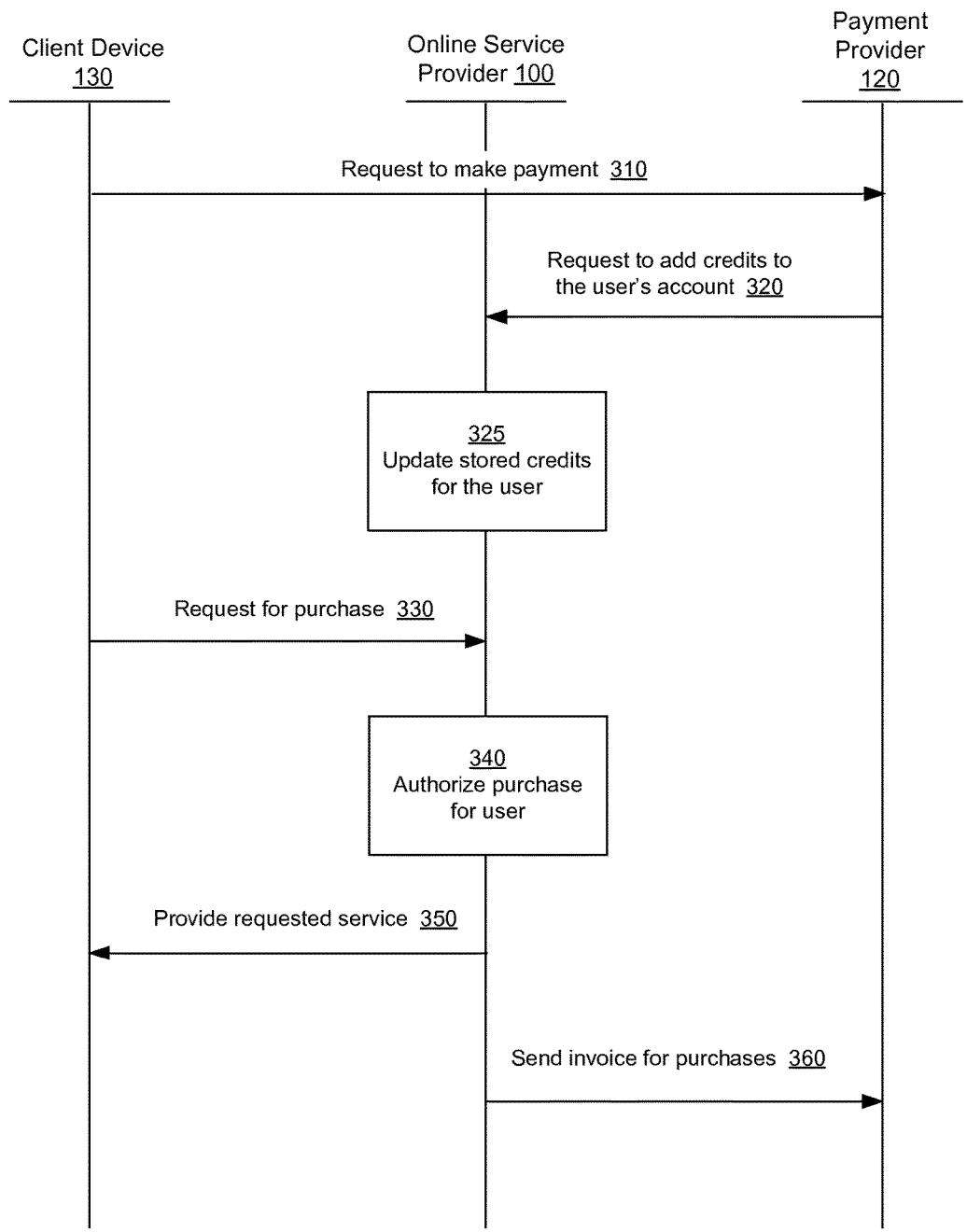
FIG. 3 is an interaction diagram of a process of making a purchase using the online service provider such that credits to the user account are added before the purchase, in accordance with an embodiment of the invention.

FIG. 3 is an interaction diagram of a process illustrating how a user makes purchases using the online service provider such that credits to the user account are added before the purchase is made, in accordance with an embodiment of the invention. As shown in FIG. 3, a client device 130 sends a request 310 to make a payment to a payment provider 120 for a user 135 of the client device 130. The client device 130 may send information including credit card information or a bank account information for making the payment. The payment provider 120 sends a request 320 to the online service provider 100 to add credits to the user's account. The requests sent by the payment provider 120 to the online service provider 100 invoke a standard interface provided by the payment platform 110 of the online service provider 100.

The online service provider 100 may perform authentication of the request to ensure that the request is from an authentic payment provider 120. The online service provider 100 updates 325 stored credits for the user by the amount requested by the payment provider. In an embodiment, a transaction fee may be charged for the transfer of credits from the payment provider to the online service provider 100. The transaction fee may be charged by the payment provider 120 or by the online service provider 100 or both. If the online service provider 100 charges the transaction fee, the online service provider may reduce the stored credits by an amount corresponding to the transaction fee.

The client device 130 sends 330 a request for a purchase to the online service provider 100 on behalf of the user 135. The request 330 can be for a purchase of a product or service offered by the online service provider 100. The online service provider 100 may authorize 340 the purchase. To authorize the purchase, the online service provider 100 verifies if the user can make payment for the purchase. In an embodiment, the verification comprises checking whether the current number of stored credits for the user exceeds a threshold value, for example, the purchase price of the product of service being purchased. In another embodiment the verification comprises looking at the past history of the user. For example, if the user is associated with a history of making regular payments towards the purchases, the user may be allowed to make the current purchase even if the number of stored credits for the user is below a threshold, for example, below the purchase price of the product or item.

In an embodiment, the online service provider 100 may charge a transaction fee for the purchase. For example, the online service provider 100 may charge the transaction fee to the user 135 making the purchase. The online service provider 100 sends 360 an invoice for purchases made by the user to the payment provider 120. The invoice may be for purchases made during a particular time interval, for example, all purchases made in the past billing cycle. The payment provider 120 may use the invoice to determine whether to further add credits for the user. The invoice may be sent 360 to the payment provider 120 responsive to a request made by the payment provider 120.

Figure 4:
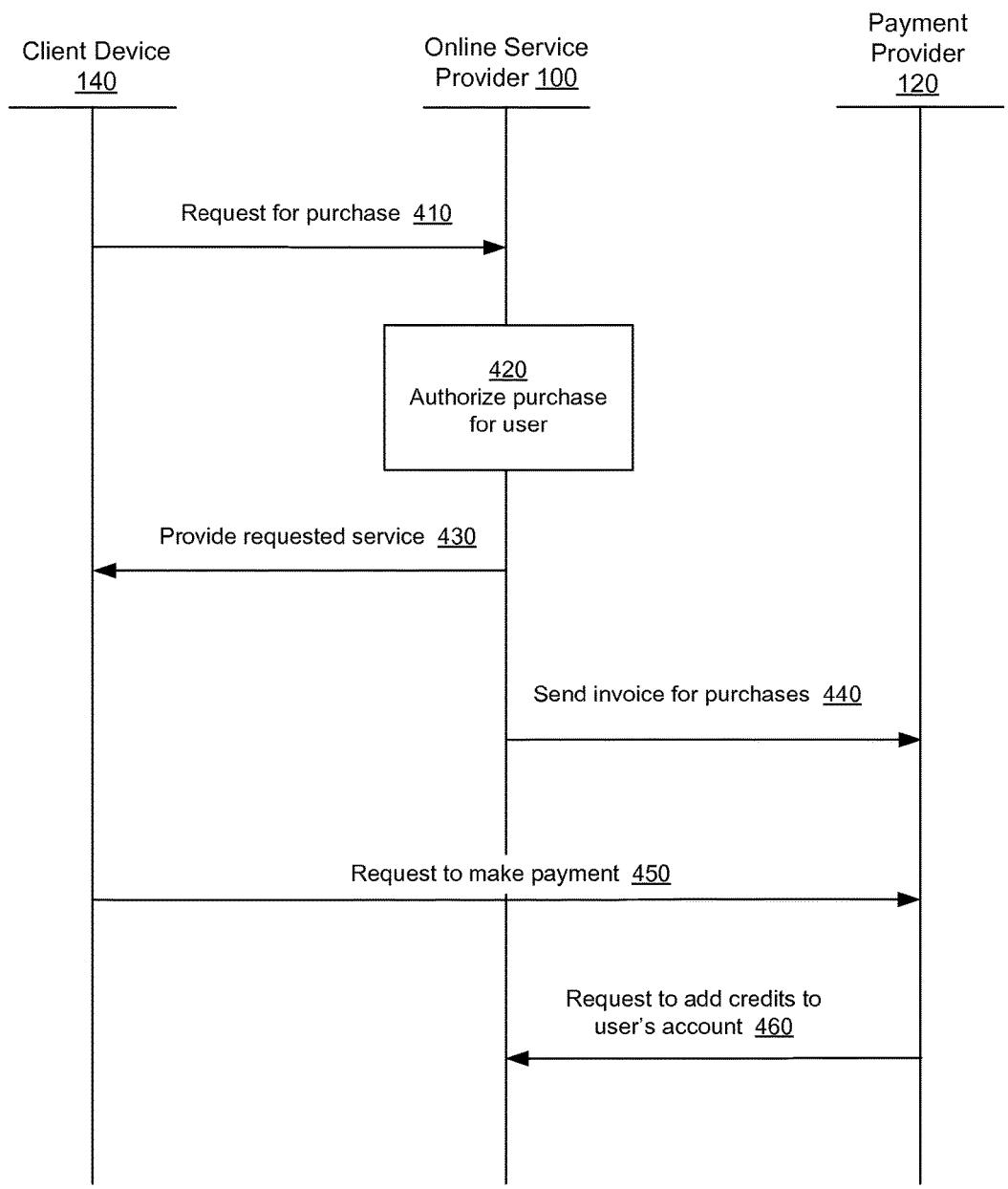
FIG. 4 is an interaction diagram of a process of making a purchase using the online service provider such that credits to the user account are added before the purchase, in accordance with an embodiment of the invention.

FIG. 4 is an interaction diagram of a process illustrating how a user makes purchases using the online service provider such that credits to the user account are added after the purchase is made, in accordance with an embodiment of the invention. The client device 130 sends 410 a request for a purchase to the online service provider 100 on behalf of the user 135. The request 410 can be for a purchase of a product or service offered by the online service provider 100. The online service provider 100 may authorize 420 the purchase based on either the current number of stored credits for the user or the past history of payments of the user. If the online service provider 100 authorizes the purchase, the online service provider 100 provider 430 the requested service to the user.

The online service provider 100 sends 440 information comprising an invoice for purchases made by the user to the payment provider 120. In an embodiment, the invoice is sent to the payment provider 120 in response to a request sent by the payment provider 120. The request for an invoice can be made by the payment provider 120 by invoking a payment API 260 supported by the payment platform 110. The user sends a request 450 to make a payment to the payment provider via the client device 130. The request 450 may comprise payment information including credit card information or bank account information for making the payment. The user may send 450 the request to make payment 450 in response to a message from the payment provider 120, for example, a message informing the user of the invoice received from the online service provider 100. The payment provider 120 may execute a transaction for getting payment from the user. The payment provider 120 sends a request 460 to the online service provider 100 to add credits to the user's account. In an embodiment, the payment provider 120 may periodically send 460 the requests to add credits to the user's accounts. The payment provider 120 may send 460 the request responsive to a payment 450 made by the user or the payment provider 120 may bill the user after adding 460 credits to the user's account for the online service provider.

Alternative Embodiments

Figure 5:
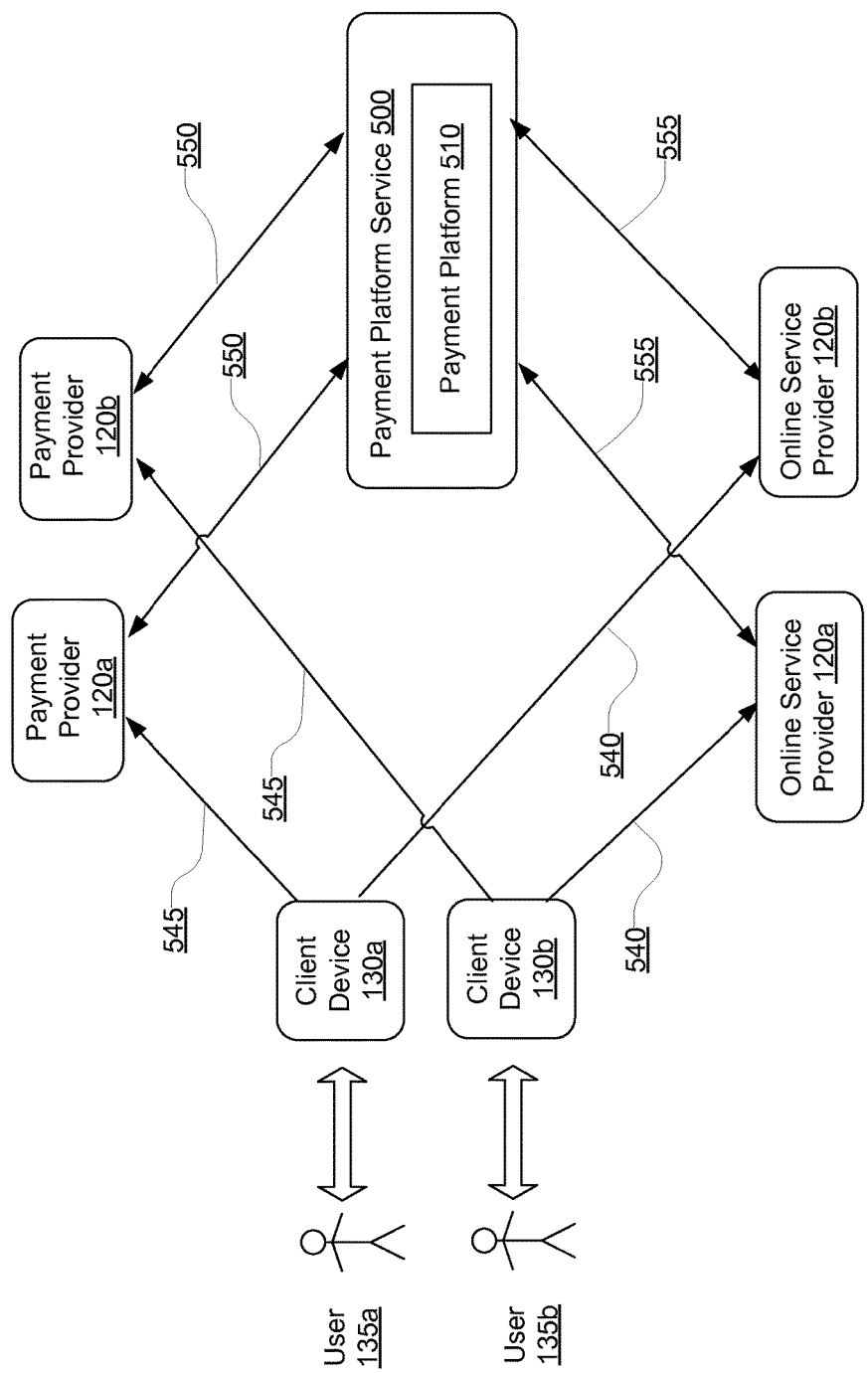
FIG. 5 is a diagram of a system environment for a payment platform service that provides a standard interface for payment providers to make payments for multiple online service providers, in accordance with an embodiment of the invention.

In an embodiment, the payment platform 110 may be provided as a service by a separate vendor and various online service providers 100 may interact with the system implementing the payment platform service. FIG. 5 is a diagram of a system environment for a payment platform service that provides a standard interface for payment providers to make payments for multiple online service providers, in accordance with an embodiment of the invention. Although the online service providers 100 need to interface with the payment platform service 500, each online service providers 100 has to implement only a single interface provided by the payment platform 110 of the payment platform service 500. The interactions between the payment providers 120 and the payment platform 110 are supported by the payment platform service 500. Therefore, the online service providers 100 do not need to implement the payment platform 110.

The payment platform service 500 comprises a payment platform module 510. The payment platform module 510 allows the payment providers 120 to interact with the payment platform service 500 as well as the online service providers 100 to interact with the payment platform service 500. The users 135 interact 540 with the online service providers 100 using their client devices 130 to make purchases. The users 135 interact 545 with the payment providers 120 to make payments to the payment provider 120. The payment providers 120 interact 550 with the payment platform service 500 to add credits for a user and also to receive invoices for purchases made by a user from an online service provider 100.

The online service providers 100 interact 555 with the payment platform service 500 to determine whether the online service provider should authorize a purchase by the user. The online service provider 100 may receive a response that indicates whether the online service provider should go ahead and authorize the purchase or deny the purchase request. Alternatively, the online service providers 100 may request specific information related to the user and then determine whether to authorize the purchase. For example, the online service providers 100 may request the current amount of credits available for the user. The online service providers 100 may authorize a purchase, for example, if the currently available credits for the user requesting the purchase exceed the purchase price of the product/service requested for purchase.

In other embodiments, the online service providers 100 may request the payment platform service 500 to provide a measure indicating past payment history of the user. The measure of past payment history of the user may be a payment score. The online service provider 100 uses the payment history information to determine whether the purchase should be authorized. For example, if the purchase price of the product/service requested is below a threshold value, the online service provider 100 authorizes the purchase if the payment score for the user exceeds a threshold value.

The payment platform service 500 also interacts 555 with the online service provider 100 to make payments for the invoices received from the online service provider 100. The online service providers 100 also interact 555 with the payment platform service 500 to send invoices of purchase made by users. The invoice may be for a single purchase or for all the purchases made during a time interval, say a billing cycle. The payment platform service 500 may send the information provided in the invoice for a given user to appropriate payment providers 120 associated with the user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
    maintaining by an online service provider, user accounts for storing credits for users of the online service provider, the credits for making purchases from the online service provider;
    maintaining a standard interface to be provided to a payment provider, the standard interface comprising a function that allows multiple different payment providers to initiate a transaction at the online service provider that adds credits to one or more user accounts;
    receiving by the online service provider, a purchase request from a user to purchase a service offered by the online service provider;
    receiving, from the payment provider, a request to add credits to a user account of the user, the payment provider newly introduced and not having previously supported users of the online service provider;
    providing, to the payment provider, the maintained standard interface;
    receiving a payment request from the payment provider via the standard interface, the payment request comprising information identifying the user of the online service provider and an amount for crediting to the user account for the user;
    executing a transaction by a processor of the online service provider to increase a number of credits in the user account for the user based on the amount received in the payment request;
    sending information comprising an invoice based on the amount by which credits are increased in the user account; and
    providing the requested service offered by the online service provider to the user.

2. The computer implemented method of claim 1, further comprising:
    receiving a request from the user for making a purchase from the online service provider, the purchase for a purchase price; and
    authorizing a transaction for the purchase requested by the user based on the credits in the user account.

3. The computer implemented method of claim 1, wherein the payment provider comprises a financial institution, the financial institution providing credits to users responsive to a payment made by the users to the financial institution.

4. The computer implemented method of claim 1, wherein the payment provider comprises an individual.

5. The computer implemented method of claim 1, wherein the payment provider comprises a business providing credits to users for actions performed by the users, the actions comprising interactions between the users and the business.

6. The computer implemented method of claim 1, wherein the payment provider sends a second request to add credits for the user responsive to receiving the invoice from the online service provider.

7. The computer-implemented method of claim 1, wherein the request received from the payment provider initiates a transaction to add credits to one or more user accounts maintained by the online service provider.

8. A computer implemented method comprising:
    maintaining by an online service provider an account for storing credits for a user, the credits for making purchases from the online service provider;
    maintaining a standard interface, the standard interface comprising a function that enables multiple different payment providers to execute a transaction at the online service provider that adds credits to one or more user accounts;
    receiving by the online service provider, a purchase request from a user to purchase a service offered by the online service provider;
    providing, to a payment provider, the maintained standard interface, the payment provider newly introduced and not having previously supported users of the online service provider;

receiving, by the online service provider, a request from the payment provider to add credits for the user, the request comprises information identifying the user and a number of credits to be added to the account for the user;

increasing, by a processor, credits in the account for the user based on the number of credits requested to be added; and sending information describing an invoice from the online service provider to the payment provider, the invoice charging an amount to the payment provider, the amount representing the increased number of credits increased for the user; and providing the requested service offered by the online service provider to the user.

9. The computer implemented method of claim 8, wherein the invoice is sent to the payment provider responsive to a request from the payment provider invoking the standard interface provided by the online service provider.

10. The computer implemented method of claim 8, wherein the request from the payment provider invokes a standard application programming interface (API) provided by the online service provider, the API for use by the payment provider.

11. The computer implemented method of claim 8, wherein the payment provider is a financial institution, the financial institution providing credits to the user responsive to a payment made by the user to the financial institution.

12. The computer implemented method of claim 8, wherein the payment provider is an individual.

13. The computer implemented method of claim 8, wherein the payment provider is a business providing credits to the user for actions performed by the user, the actions comprising interactions between the user and the business.

14. The computer implemented method of claim 8, wherein the payment provider sends a second request to add credits for the user responsive to receiving the invoice from the online service provider.

15. The computer implemented method of claim 8, further comprising:

receiving a request from the user for making a purchase from the online service provider, the purchase for a purchase price; and authorizing a transaction for the purchase requested by the user based on the credits in the user account.

16. A computer implemented method comprising:

receiving by a payment provider, a request from a user to add an amount of credits to a user account at an online service provider by making a payment to the payment provider, the payment provider newly introduced and not having previously supported users of the online service provider;

establishing a connection with the online service provider through a standard interface that comprises a function enabling the payment provider to execute a transaction at the online service provider to add the amount of credits to the user account, the standard interface being configured to establish the connection with multiple different payment providers;

sending, a request to the online service provider via the standard interface, the request comprising information identifying the user and the amount of credits to be added to the user account for the user by the online service provider; and receiving information comprising an invoice for the user from the online service provider, the invoice based on the amount by which credits are increased in the user account.

17. The computer implemented method of claim 16, wherein the payment provider is a financial institution, the financial institution providing credits to the user responsive to a payment made by the user to the financial institution.

18. The computer implemented method of claim 16, wherein the payment provider is an individual.

19. The computer implemented method of claim 16, wherein the payment provider is a business providing credits to the user for actions performed by the user.

20. The computer implemented method of claim 16, wherein the payment provider sends a second request to add credits for the user responsive to receiving the invoice from the online service provider.

21. The computer implemented method of claim 16, further comprising:

sending a request for receiving the invoice for purchases by the user.

* * * * *